United States Patent [19]

Evert

[11] 3,873,747

[45] Mar. 25, 1975

[54] METHOD FOR STERILIZING A FOOD PRODUCT IN A CONTAINER

[75] Inventor: Jan Thomassen Evert, Boxtel, Netherlands

[73] Assignee: Thomassen & Drijver-Verblifa N.V., Deventer, Netherlands

[22] Filed: July 5, 1973

[21] Appl. No.: 376,288

Related U.S. Application Data

[63] Continuation-in-part of Ser. No. 135,799, April 20, 1971, abandoned.

[30] Foreign Application Priority Data

Apr. 26, 1970 Netherlands....................... 7006062

[52] U.S. Cl................. 426/325, 426/131, 426/151, 426/324, 426/326, 426/332, 426/335
[51] Int. Cl.............................................. A23b 1/00
[58] Field of Search ........... 426/151, 324, 325, 326, 426/331, 332, 335, 399, 401, 407, 131

[56] References Cited

UNITED STATES PATENTS

| | | | |
|---|---|---|---|
| 1,021,770 | 4/1912 | Glacken............................ | 426/324 |
| 3,180,740 | 4/1965 | Martin............................... | 426/399 |
| 3,443,972 | 5/1969 | DiMarco et al.................... | 426/325 |

*Primary Examiner*—Hyman Lord
*Attorney, Agent, or Firm*—McGlew and Tuttle

[57] ABSTRACT

A method of sterilizing food products in a closed vessel, such as a tin or jar, comprises adding only a relatively small quantity of a liquid, such as ethanol, before closing the vessel. The liquid completely evaporates at the sterilization temperature and pressure; it is miscible with at least a part of the product; is not injurious to health, does not influence the taste of the sterilized product unfavorably, and may provide an additional preserving action. Thus, the usual additional liquid may be omitted and a high temperature and/or prolonged duration of the heat treatment may be avoided.

1 Claim, No Drawings

METHOD FOR STERILIZING A FOOD PRODUCT IN A CONTAINER

CROSS-REFERENCE TO PRIOR APPLICATION

This application is a continuation-in-part of copending application Ser. No. 135,799, filed on Apr. 20, 1971 now abandoned.

BACKGROUND AND PRIOR ART

In the method of sterilizing food products, such as meat, fish and poultry in closed tins, jars or other vessels, it is generally known that, after inserting the food product, e.g., poultry, a so-called pouring liquid is added to fill the vessels before the vessels are closed. However, the taste and smell of the sterilized poultry or other food product will largely be lost, mainly because of the flavor being leached out into the pouring liquid. This is so especially when preserving whole chickens or the like, because a relatively large amount of space (about 40%) remains empty, and this space is filled with the pouring liquid in order to enable a good heat exchange from the wall of the vessels towards the contents thereof.

This problem not only applies to poultry but also to other kinds of meat, fish and like non-acid food products in general which, mainly because of their fixed shape, cannot be inserted into a vessel in such a manner that only a little empty space remains. Also, in the case of other food products which completely fill the vessels so that no pouring liquid is necessary, prolonged sterilization may cause a loss of taste. Moreover, by using a pouring liquid, the product sterilized therein will become soft, thus making the difference still larger in respect of the freshly cooked product. Furthermore, the appearance of the cooked product is impaired by immersion in the liquid.

In order to overcome these disadvantages, according to the prior art, it has already been proposed to wrap the food products under reduced pressure in a plastic foil which is impermeable to the liquid and which is resistant to the sterilization temperature. This wrapped food product then is inserted into a tin or the like, and the remaining space is filled with water. However, the plastic foil is not completely impermeable to the flavor, so that after a prolonged storage, loss of taste will take place. Moreover, the wrapping of the product in foil at a reduced pressure requires additional operations and devices, and the wet foil sticking to the product will make an unappetizing impression on many buyers. Furthermore, the foil has to be removed before use, and this cannot always be done without difficulty or without damaging the product.

Another disadvantage of the use of a pouring liquid is that tap water, especially when it contains much chlorine, may affect the taste so that the liquid should be thoroughly boiled. A final disadvantage of the use of liquid is that it accounts for a substantial part of the weight of the product and this weight is, for the rest, useless and impedes the transport and storage of this product.

Prior art methods, while recognizing the problems discussed herein, have not solved these problems as is done in the present invention. Prior art methods generally are either less efficient and more expensive or not applicable to the non-acid food products, such as meat, fish and poultry, which are sterilized according to the present invention. Thus, U.S. Pat. No. 1,021,770 (Glacken) relates to the process of canning of acid fruits and vegetables in which the container is completely filled with the food product and a liquid which is treated to retard or prevent interaction between the container and the acid fruit or vegetable product. While Glacken teaches use of small amounts of ethanol in this canning process, the process steps are different and the kind of food product is also generally very different from that of the present invention, namely, chicken, or other poultry products, meat and fish. In the present invention, it is essential to avoid use of any liquid contacting the food product during and after sterilization; the small amount of ethanol is vaporized during heating and sterilization according to the present invention.

A more recent patent, U.S. Pat. No. 3,180,740 of Martin, also discloses a process including use of ethanol in sterilization. However, this process does not involve food sterilization. Rather, the process is directed to production of sterile packages for food. Martin is concerned with a pre-sterilization process which comes before food canning and sterilization of the food product contained in the packages or vessels containing the food product. Also, Martin involves a complicated multistage process including washing, heating, etc. of the container prior to actual filling and closing the same. There is no disclosure or teaching in Martin which includes addition to, or treatment of, the canned food product with ethanol as is done according to the present invention.

In another U.S. Pat. No. 3,443,972 of Di Marco, et al. a process is taught using a benzoic acid n-alkyl ester derivative to inhibit bacterial growth in canned food products. This process requires intimately admixing the benzoic acid derivative with the food to be preserved and thereafter subjecting the food product to heat sterilization in the conventional manner with, however, lower temperatures and less times of sterilization by heating. Di Marco thus recognizes the problem of prolonged heating of food products at higher temperatures: this impairs the taste and condition of the product. Di Marco solves this problem by addition of a germicidal compound, a chemical additive, not naturally available, namely, a complex benzoic acid ester compound. While this is an improvement in the art, Di Marco did not disclose, or even suggest, the use or advantages of ethanol as an additive to the food product during canning or packaging of the food product in a vessel or other container, as is done according to the present invention. Certainly, the germicidal effect of ethanol has been known for a long time. As the prior art discussed herein teaches, ethanol is known as a germicidal solution for washing or sterilizing food containers and packages. A 1959 British Pat. No. 869,448 to Spofa teaches use of dilute solutions of ethanol as a temporary preservative for foodstuffs subject to rapid deterioration. However, the SPOFA patent does not teach use of substantially pure ethanol for long lasting preservation of non-acid food products in closed containers, such as vessels including tins and jars in a heat treatment process such as canning. The object of SPOFA is not sterilization while canning or packaging of food products, but rather preservation without canning.

It is clear, therefore, from the foregoing discussion of the present state of the art, as disclosed by these prior art patents, that the present invention represents a surprisingly simple, efficient and inexpensive process of sterilizing food products which are to be stored in closed containers or vessels such as tins, jars and the like. In this connection, it is to be noted that the term container, as used herein, is intended to refer to any useful container in the canning of food products, e.g. non-acid food products like meat, fish and poultry, including tins, jars or glass containers, plastic or aluminum cans, flexible plastic bags, pouches, and the like.

SUMMARY OF THE INVENTION

The process of the present invention is an improvement in the sterilization of food products, preferably non-acid food products which consist essentially of meat, fish and poultry, especially chicken. These food products may be fresh and uncooked, or they may preferably be prepared for eating by various cooking methods, such as cooking by frying as in the preferred embodiments, like chicken, described herein. The process of the invention comprises (a) placing the food product in a vessel or container which can be sealed or closed: (b) placing a controlled amount of substantially pure liquid, preferably ethanol in an amount of about 0.05 to 5% by volume, into the container; (c) closing the container with food product and liquid therein so that the container is only partially filled when closed; and (d) heating the closed container for a time and at a temperature sufficient to sterilize the food product therein.

The present invention also relates to the sterilized food product which is preserved according to the process described herein.

The invention further relates to the closed container or vessel containing the sterilized food product which is prepared according to the aforesaid process described herein.

DESCRIPTION OF SPECIFIC EMBODIMENTS

The present invention provides an improved method for sterilizing food in a closed vessel, such as a tin or jar, without any of the foregoing disadvantages. The invention is characterized in that before closing the vessel, only a small quantity of liquid is added in proportion to the volume of the whole vessel and completely evaporated at sterilization temperature and pressure. This liquid is miscible with at least a part of the product and is not injurious to health. It does not (or not unfavorably) influence the taste of the sterilized product and may, moreover, provide an additional preserving action. In practice, nearly always, substantially pure ethanol will be used for this purpose.

Although the effect of this liquid during and after sterilization has not been fully investigated, it is rather probable that this liquid and/or its vapor completely penetrates the product to be sterilized and provides an additional sterilizing action, probably by causing an accelerated perishing of the micro-organisms during the heat treatment and by effecting a retardation of the germination of the surviving spores after the treatment. Thus, the reduction of the heat sterilization caused by the lower heat transfer when omitting the pouring liquid may be acceptable, and thus, the very considerable extension of the sterilization time is avoided, as well as the raising of the sterilization temperature which would otherwise be necessary. After cooling the sterilized product, the vapor will condense and then a homogeneous mixture with fat, water and gelatine from the product may be formed. Since very often alcoholic beverages are used in the preparation of meat dishes for improving the taste, the small amount of ethanol will not lead to an unfamiliar change of taste. In practice, the amount of ethanol required will be from about 0.05 to about 5% by volume depending upon the character of the product and then little or no change of taste will occur.

The method of the invention also may be applied in the case of food products which completely fill the vessels, in order to allow, as a consequence of the additional sterilizing action of the additive, a reduction of the sterilization temperature and/or duration of sterilization. This is very important for sterilizing food products, the taste or nourishing value of which may suffer from such heat treatment.

It is not necessary to indicate herein the duration and temperature range of the operation, since the present invention concerns two different cases:

1. In the preferred case, according to the invention, the food product has a definite shape differing from that of the container, for instance, whole chickens, sausages, etc. When no pouring liquid is used, normal heat sterilization is only possible either by using a much higher temperature in the sterilization vessel in order to provide a higher temperature gradient, so that in spite of the poor heat conductivity of the empty space in the container, a sufficient heating of the product is obtained in a reasonable time, or by heating the container during a much longer period, and both solutions are uneconomical. The addition of ethanol provides an additional germicidal action, so that a lower temperature of the product is effective to obtain the desired sterilization with a temperature of the vessel and a duration of the treatment which correspond to the values used in normal sterilization processes without additives but with a pouring liquid.

2. In the second case, the food product is often acid and also the food product has no definite shape and fills at least the greater part of the containers, for instance, vegetable and meat hash products, boiled vegetables, fruit products and the like. The heat transfer is then so that the normal sterilization process would be possible, but by adding ethanol, lower temperatures or shorter durations may be favorable for certain qualities of the product such as taste, nutritive value, color and the like.

In case 1, the duration and temperature may have the normal values, but in case 2, one of, or both, values are lower than normal. However, these "normal" values cannot be specified either, since they will depend on the character of the product. In the case of chickens, for instance, a very careful sterilization is necessary, since it is known that the surviving changes of micro-organisms in some less accessible parts of the body (e.g., in wing parts) are rather high. More homogeneous products may be sterilized at lower temperatures and/or shorter periods.

For sterilizing poultry, it is advisable to cut the breast thereof completely open, so that the vapor may better reach the inner parts thereof. In some cases, the amount of alcohol should be increased for bacteriological reasons.

The invention thus leads to an important improvement without requiring expensive apparatus or additives and, moreover, a considerable reduction of the weight to be transported is obtained. A further advantage is that on opening the vessels, no liquid will run out, and no liquid is to be discarded. Furthermore, the product may be eaten directly or may be warmed up. The product does not contain water, in contradistinction to deep-frozen products, so that a correct net weight may be sold. Such products may also be prepared substantially without fat and/or without starchy gravy, as diet food.

As mentioned before, the method according to the invention is suitable for all kinds of food products to be sterilized, in which the taste and/or the appearance might be impaired by sterilization in a pouring liquid or by sterilization at the usual sterilization temperature and/or duration of sterilization.

The following examples are illustrative only, and are not intended to limit the scope of the invention in any way.

EXAMPLES

Fried chickens having an average weight of 600 grams were inserted into tins of 1 liter, and about 1 ml (cc) ethanol (96% aqueous) was added to each tin. Then the tins were closed and subsequently heated in an autoclave at about 117°C and a pressure of about 0.6 at (above atmospheric). The sterilized product was externally dry but juicy and savory, and had an excellent taste which could not be distinguished from freshly fried poultry. An alcoholic taste was not perceptible, and on the bottom of the tins a homogeneous layer of clear gelatine was collected. The meat had the same consistency and color as the freshly cooked product.

If in the foregoing example, instead of fried chicken, fried fish, such as filet of sole, is sterilized, then similarly good results are obtained. In similar fashion, if breaded cooked veal cutlets are preserved, then similarly good results are obtained.

In all of these examples, the temperatures of heating are generally well above about 100°C and range up to about 150°C. The chicken is preserved well if a time of about 10 minutes is employed under the conditions of this example; however, generally a time of heating is used from about 3 minutes to about 15 minutes, depending on the shape and nature of the food product to be preserved.

While specific embodiments of the invention have been shown and described in detail to illustrate the application of the principles of the invention, it will be understood that the invention may be embodied otherwise without departing from such principles.

What is claimed is:

1. Method for sterilizing a food product in a container said food product being selected from the class consisting of meat, fish and poultry, and having a substantially fixed shape which differs from that of the container which consists of inserting the food product to be sterilized into the container so that said product only partially fills said container; introducing, before closing said container, from about 0.05% to about 5%, by volume of said container, of substantially pure ethanol; closing said container; and heating said container at such a temperature and for such a time that a sufficient sterilization of the food product by the combined effect of heat and ethanol is obtained, the latter being completely evaporated at the sterilization temperature.

* * * * *

UNITED STATES PATENT OFFICE
CERTIFICATE OF CORRECTION

Patent No. 3,873,747            Dated March 25, 1975

Inventor(s) Jan Thomassen Evert

It is certified that error appears in the above-identified patent and that said Letters Patent are hereby corrected as shown below:

On the Title page:

In item [75] "Jan Thomassen Evert" should read
-- Evert Jan Thomassen --.

Signed and Sealed this ninth Day of September 1975

[SEAL]

Attest:

RUTH C. MASON
*Attesting Officer*

C. MARSHALL DANN
*Commissioner of Patents and Trademarks*